United States Patent [19]

Skoch et al.

[11] E Patent Number: Re. 31,804

[45] Reissued Date of Patent: Jan. 15, 1985

[54] ANIMAL FEED BLOCK CONTAINING FERROUS SULFATE AND MAGNESIUM OXIDE

[75] Inventors: Leroy V. Skoch, Glencoe; Bud G. Harmon, Kirkwood; Charles W. Dickerson, Des Peres, all of Mo.

[73] Assignee: Ralson Purina Company, St. Louis, Mo.

[21] Appl. No.: 573,981

[22] Filed: Jan. 26, 1984

Related U.S. Patent Documents

Reissue of:

[64] Patent No.: 4,171,386
Issued: Oct. 16, 1979
Appl. No.: 893,736
Filed: Apr. 5, 1978

[51] Int. Cl.[3] ..... A23K 1/02

[52] U.S. Cl. ..... 426/658; 426/69; 426/74; 426/623; 426/630; 426/807

[58] Field of Search ..... 426/69, 74, 623, 630, 426/635, 656, 807

[56] References Cited

U.S. PATENT DOCUMENTS 3,950,546 8/1976 Hill ..... 426/74
4,016,296 8/1977 DeSantis ..... 426/69
4,160,041 7/1979 Schroeder et al. ..... 426/69

*Primary Examiner*—R. B. Penland
*Attorney, Agent, or Firm*—Virgil B. Hill

[57] ABSTRACT

An animal feed supplement in a solid, weather resistant block form and method of making is disclosed. The molasses, based feed supplement block, intended for consumption primarily by ruminant animals, although not limited thereto, contains ferrous sulfate as a blocking agent. The feed supplement also comprises a water absorbent clay, a phosphorous source and magnesium oxide as well as an edible fat or oil in sufficient quantities to set into a solid block form in less than one hour at room temperature when admixed with the blocking agent. A preferred block composition is prepared by a method which comprises admixing the molasses, water, phosphorus source and water absorbing clay under high speed shearing action of an effective amount of time to disperse the clay, admixing edible fat and dispersing it in the mixture and then admixing ferrous sulfate and magnesium oxide to obtain a viscous nutrient mixture that thickens quickly. The mixture is then poured into molds or packages and solidifies within one hour at room temperature to form a hard block.

10 Claims, No Drawings

ANIMAL FEED BLOCK CONTAINING FERROUS SULFATE AND MAGNESIUM OXIDE

Matter enclosed in heavy brackets [ ] appears in the original patent but forms no part of this reissue specification; matter printed in italics indicates the additions made by reissue.

BACKGROUND OF THE INVENTION

This invention relates primarily to an animal feed supplement and, more particularly, to improvements in an animal feed supplement in block form and the attendant method of preparation wherein the ingredients set into a solid block form within a relatively short period of time.

A common practice today is to feed animals supplemental feedstuffs or mixed rations which have been fortified with nutritive elements. The feedstuffs have been developed in block form to permit free choice feeding and reduce the labor required for mixing the nutritive supplement with the animals' feed ration. Serving as an illustration of the prior art are salt blocks, mineral blocks, protein blocks and molasses blocks.

It is known in the art to prepare hard, animal feed blocks by, for example, (a) compressing and molding a mix of hay, straw, grains and the like, with or without molasses, to a desired shape and weight or (b) evaporative heating of the ingredients. The heating may oxidize or decompose heat sensitive ingredients wherein the compressed blocks have limited amounts of energy supplying ingredients. Additionally, there are modifications of method (b), showing heating and/or emulsifying agents to disperse the energy supplying ingredients. U.S. Pat. No. 3,420,672 discloses the use of gelatinized starch as an emulsifying agent in the preparation of solid, animal feed emulsions containing molasses, fatty material, urea, phosphate, bentonite and other ingredients. U.S. Pat. No. 4,016,296 shows the use of calcium oxide with a fatty acid to form a concentration of hard soap in the feed block in order to impart hardness to the block. U.S. Pat. No. 4,027,043 discloses a molasses block containing a fat emulsifying agent and a heating step in its method of preparation to disperse the solid ingredients into the liquid ingredients.

It is accordingly, believed there is a need for an economical, nutritionally balanced, hard, animal feed supplement in block form containing energy supplying ingredients that can solidify at ambient temperatures in a relatively short period of time.

SUMMARY OF THE INVENTION

It is an object of the present invention to provide a novel animal feed supplement composition which embodies molasses as the major ingredient in a solid, weather resistant block form.

Another object of the invention is to provide a hard animal feed block containing energy supplying ingredients without emulsifying agents to disperse and suspend the energy supplying ingredients.

Another object of the invention is to provide a hard, weather resistant animal feed block which contains molasses as major ingredient and provides a suitable medium or carrier for a variety of additional feed supplement materials, including but not limited to protein in the natural plant form, such as soy flakes, dehydrated alfalfa, cottonseed meal, fish meal, wheat midds, soybean meal, and corn, etc; and non protein nitrogen sources such as urea, biuret, ammonium sulfate, etc.; salt, fat in a variety of forms, fiber sources such as rice hulls, cottonseed hulls; sugar, magnesium, calcium, clay, phosphorous and various trace elements.

And yet, another object of this invention is to provide a solid, weather resistant molasses based animal feed block which can serve as a medium or carrier for medicaments, hormones, vitamins, minerals, antibiotics, insecticides or anthelmintics for animals with ruminant or non-ruminant digestive systems.

Another object of the present invention is to provide a novel method of making the animal supplement composition which includes the steps of providing a supplement mixture containing molasses as a major ingredient and utilizing a blocking agent, ferrous sulfate, to give the composition a hard, solid structural character. The block composition is prepared by a method which comprises admixing a major portion of molasses, water, phosphorous source and water absorbent clay under high speed shearing action for an effective amount of time to disperse the clay, admixing edible fat and dispersing it in the mixture and then admixing ferrous sulfate and magnesium oxide to obtain a viscous nutrient mixture. The mixture can then be poured into molds or packages and solidifies within one hour at room temperature to form a solid hard, weather resistant block.

These and other objects and advantages will become apparent hereinafter.

DETAILED DESCRIPTION OF THE INVENTION

A typical formulation for the product obtained in accordance with the invention comprises the following nutritive ingredients:

| INGREDIENTS | % BY WEIGHT |
|---|---|
| Molasses | 18-65 |
| Mono-ammonium phosphate | 4-9 |
| Ammonium Polyphosphate | 0-3 |
| Tetrasodium Pyrophosphate | 0-5 |
| Attapulgite Clay | 0.5-5.0 |
| Water | 5-20 |
| Fat Source | 5-30 |
| Magnesium Oxide | 3-15 |
| Ferrous Sulfate | 8 |

It's also possible and preferable to add other dry nutritive ingredients that can be dispersed and suspended in the above formulation to create a diverse animal feed supplement that sets within one hour of manufacture. Forms of natural protein such as grains, corn, corn flour, dehydrated alfalfa, spent soy flakes, soybean meal, cottonseed meal, peanut meal and non-protein nitrogen sources such as urea, and biuret as well as various other additives which may be included in the formulation such as vitamins, minerals, high fiber materials, etc. Preferably, the dry ingredients may be present in amounts ranging from about 0 to 15% by weight.

Molasses, which is a major nutritive ingredient of the composition, can be any commercial molasses product. The molasses can be any of the sugar containing molasses such as those obtained as the by products of the processing of sugar beets, sugar cane, corn or wood. Exemplary of these are blackstrap molasses, converted molasses, wood sugar molasses, hydrol syrup, citrus molassess and the like. Molasses has varying amounts of solids which affect its viscosity and the measure of the amount of such solids is normally given in terms of Brix.

With no intention to limit the present invention, for the consistency of the molasses that may be used has a wide variance, the Brix of commercially available molasses which may be used in the invention normally falls within the range of 60° to 90° Brix. The concentration of the molasses in the process and product of this invention is generally from about 18 to 65% by weight and preferably from about 40 to 52 percent by weight.

With respect to the clay constituent in the formulation, it is generally present in the process and product in amounts ranging from about 0.5 to about 5.0% by weight and preferably in an amount from about 1.0 to 1.5% by weight. The clay should be water absorbent and those can be employed include attapulgite clay, bentonite, kaolin and mixtures thereof. Attapulgite clay is preferred although satisfactory results are obtained with all the aforementioned clays. The function of the clay is believed to be a suspending agent which upon high speed shear mixing suspends and prevents segregation of the other ingredients of the formulations throughout the mixture which sets into a hard animal feed block.

The phosphorous source should be a mono basic or mono valent salt of phosphoric acid and added to the nutrient block formulation in an amount effective to aid in dispersing the water absorbent clay in such a manner to fully utilize its capabilities as a suspending agent. A preferable phosphorous source is monoammonium phosphate and is desirably present in amounts ranging from about 4 to about 9% by weight. And another optional phosphorous source that is particularly suitable is tetrasodium pyrophosphate and is preferably present in the block formulation in amounts ranging from about 0 to 5% by weight, preferably about 3 to 5% by weight. For nutritional purposes, monoammonium phosphate can be added to the nutrient block formulation in amounts ranging from about 0 to about 3% by weight.

The fats which may be added to the nutrient block formulation include livestock, edible animal and vegetable fats and oils such as soybean oil, cottonseed oil, fish oil, grease, bleachable fancy tallow, yellow grease, beef fat, lard, and the like. The fat source used in the present invention provides energy to the animal as well as aids in the blocking process. It is present in amounts ranging from about 5 to about 30% by weight.

A critical ingredient in the nutrient block formulation is magnesium oxide. The function of magnesium oxide in the block formulation is not completely understood, but it is believed to have water binding properties to facilitate the formation of a hard feed block. It should be present in the formulation in an effective amount to set the nutrient block within one hour. Preferably, the amount should range from about 3 to about 15% by weight, most preferably, 7% by weight.

The blocking agent used in the nutrient formulation is ferrous sulfate. It has been found that the presence of ferrous sulfate in the nutrient block formulation quickens the setting time of the block formulation to less than one hour at ambient temperatures. The reasoning for this phenomenon is not completely understood, however, it is believed that ferrous sulfate acts in a synergistic manner with magnesium oxide in the setting or hardening process to produce the nutrient feed block. Ferrous sulfate in the block formulation without magnesium oxide does not produce a hard nutrient block. Magnesium oxide in the block formulation without ferrous sulfate does produce a hard block at ambient temperatures but not within one hour. Even upon heat curing, magnesium oxide does not produce an acceptably hard, nutrient block within one hour setting time. The ferrous sulfate should be present in the block formulation in effective amounts to set or harden the block, preferably within one hour. Preferably, it should be present in an amount of about 8% by weight. Higher levels of magnesium oxide possibly could lower the ferrous sulfate levels but would render the block unpalatable and too hard for practical purposes.

The interactions of water and the ingredients in the animal feed supplement are unusual. At the stated added water content of about 5–20% by weight and a molasses content of about 18 to about 65% by weight, there is sufficient free water available to aid in the convenient preparation of the block. The formulation has liquid flow properties when being mixed and becomes hard upon mixing with magnesium oxide and ferrous sulfate. The water activity ($A_w$) of the block should be at least 0.80 and not more than about 0.90. Water activity ($A_w$) is defined as the ratio of the vapor pressure exerted by the water contained in the block formulation (P) to the vapor pressure of pure water ($P_o$) at the same temperature. Water activity also can be defined as the equilibrium relative humidity (ERH) in which a food would neither gain nor lose moisture. In equation form this becomes:

$$A_w = P/P_o ERH/100$$

The $A_w$ for pure water at any temperature above its freezing point is 1.0. The $A_w$ of any food material will be in the range of 0–1.0. The $A_w$ of conventional animal feed supplements in block form range from about 0.30 to 0.60. The $A_w$ of the present feed supplement can be in the range of about 0.80 to about 0.90. Of course, the more dry ingredients included in the product, the lower the water activity will be. The animal feed supplement in block form of the instant invention has shown stability for long periods of time, at least six months, when stored at ambient temperatures or in the field.

In accordance with the practice of the present invention, a typical process for making an animal feed block comprises mixing water, about 18 to 65% by weight molasses, and about 4 to 9% by weight monobasic salt of phosphoric acid, preferably, monoammonium phosphate, and about 0.5 to 5% by weight water absorbent clay, preferably attapulgite, under high speed shearing action for an effective amount of time, preferably about 2 minutes, to disperse the clay, admixing animal fat, about 0 to 15% by weight dry ingredients, such as vitamins, minerals etc., and possibly natural protein or nonprotein nitrogen sources and then adding about 8% ferrous sulfate and about 3 to about 15%, preferably 7% by weight magnesium oxide to obtain a viscous nutrient mixture that can be poured into containers and solidifies to form a hard weather resistant block in a relatively short period of time, preferably one hour or less.

The following are examples of some of the products which can be produced in accordance with the invention. It is to be understood that the process and products are given by way of example only, and not by way of limitation.

EXAMPLE I

This example shows the preparation of an animal feed block containing molasses, water absorbent clay, phosphorous source, fat, magnesium oxide, water absorbent clay, agent, ferrous sulfate at ambient temperature. The composition was prepared by subjecting molasses, water, the phosphorous source and clay to high speed shearing action in a Waring blender for 2 minutes. Subsequently, the other ingredients are added with mixing, and with the addition of ferrous sulfate and then magnesium oxide last in order, to obtain a composition that sets in block form within one hour.

| INGREDIENTS | % BY WEIGHT |
|---|---|
| Molasses | 45.5 |
| Water | 15.0 |
| Corn Flour | 5.0 |
| Monoammonium Phosphate | 6.0 |
| Attapulgite Clay | 1.5 |
| Bleachable Fancy Tallow | 7.0 |
| Calcium Carbonate | 5.0 |
| Ferrous Sulfate | 8.0 |
| Magnesium Oxide | 7.0 |

The resulting composition had the consistency of a very thick slurry while being removed from the mixing bowl and set to a hard block in 30 minutes after being poured into a wax-coated mold at ambient temperature. It was stored at ambient temperature for 49 days and no evidence of mold growth was shown.

EXAMPLE II

This example illustrates the preparation of an animal feed block in a process similar to that shown in Example I in an effort to determine the optimum levels of ferrous sulfate and magnesium oxide that provide a satisfactory set up time. The ingredients were mixed in accordance with the process shown in Example I at room temperature. Many of the ingredients and the respective amounts in percentages by weight, remained constant in each formulation: water 15%, attapulgite clay 1.5%, monoammonium phosphate 6% and bleachable fancy tallow 5%. The amounts of molasses, ferrous sulfate and magnesium oxide were varied. The formulations showing varying amounts of ferrous sulfate contained 7% magnesium oxide and the formulations showing varying amounts of magnesium oxide contained 8% ferrous sulfate. After the formulations were prepared, they were poured into waxed lined containers and the number of days it took for them to become depackagable in block form was observed.

| | | HARDNESS OBSERVATIONS (DAYS AFTER MANUFACTURE) | | | |
|---|---|---|---|---|---|
| Formula | Molasses Content (%) | Other Variables | (%) | Hard Enough to Depackage | Did not Solidfy |
| A | 64.5 | $FESO_4$ | 1.0 | — | 32 |
| B | 63.5 | " | 2.0 | — | 32 |
| C | 62.5 | " | 3.0 | — | 32 |
| D | 61.5 | " | 4.0 | — | 32 |
| E | 60.5 | " | 5.0 | — | 32 |
| F | 59.5 | " | 6.0 | — | 32 |
| G | 58.5 | " | 7.0 | — | 32 |
| H | 57.5 | " | 8.0 | 1 | |
| I | 63.5 | MgO | 1.0 | — | 32 |
| J | 62.5 | " | 2.0 | — | 32 |
| K | 61.5 | " | 3.0 | 1 | |
| L | 60.5 | " | 4.0 | 1 | |

In this experiment, blocks did not become hard until the level of ferrous sulfate reached 8% by weight of the formulation. Blocks containing 1 to 7% ferrous sulfate and 7% MgO did not become hare when held at room temperature for 32 days. Further, blocks containing ferrous sulfate at 8% and varying levels of magnesium oxide did not become depackageable until the level of magnesium oxide reached 3% by weight of the formulation. The blocks that were depackagable, reached that condition in less than one day, in fact, within one hour of manufacture. Higher levels of magnesium oxide about 15% by weight could lower the ferrous sulfate levels but would render the block unpalatable and too hard for practical purposes.

EXAMPLE III

This example illustrates the preparation of an animal feed block containing a natural protein source and dry urea and its acceptance by beef cattle. Twenty mature crossbred cows weighing 1000 lbs each were placed in pens in groups of five. A good quality grass hay was fed on a free choice basis. Blocks consisting of the following formulations were available to the cows at all times. The block consumption was recorded weekly. The blocks were rotated to a different group of cows at the end of three weeks. The total test period was six weeks.

| | PERCENT BY WEIGHT | |
|---|---|---|
| INGREDIENTS | X | Y |
| Total Protein | 32 | 32 |
| Water | 15.0 | 15.0 |
| Molasses | 35.8 | 30.6 |
| Monoammonium Phosphate | 4.5 | 6.0 |
| Attapulgite Clay | 1.5 | 1.5 |
| Dry Urea | 7.3 | 7.0 |
| Calcium Carbonate | 1.7 | 1.7 |
| Trace Mineral | 0.2 | 0.2 |
| Vit A-D Conc. | 0.011 | 0.011 |
| Bleachable Fancy Tallow | 5.0 | 5.0 |
| Ground Soybean Meal, 49% | 15.0 | 15.0 |
| Magnesium Oxide | 3.0 | 7.0 |
| Ferrous Sulfate | 8.0 | 8.0 |
| Sodium Chloride | 3.0 | 3.0 |

The ingredients were mixed in a VAC-U-MAC® high shear turbine mixer with a turbine tip speed about 5250 ft/min. manufactured by Bard and Bard Company, Joplin, Missouri in the following sequence: water, molasses, monoammonium phosphate—mix 10 seconds, attapulgite clay, mix 2 minutes, dry urea—mix one minute, bleachable fancy tallow—mix 15 seconds, calcium carbonate, trace minerals, vitamins—mix 10 seconds, sodium chloride—mix 10 seconds, ferrous sulfate, mix 10 seconds, soybean meal—mix 10 seconds and magnesium oxide—mix one minute. Each mixture was then poured into molds and set up very quickly, in 30 minutes.

The cows consumed formulation X at 1.6 pounds per head per day and formulation Y at 1.2 pounds per head per day.

EXAMPLE IV

This example shows the use of the animal feed block as a carrier for various medicaments and the result stability of those therapeutically active substances. The therapeutically active substances that were studied included the anthelmintics, phenothiazine, coumaphos (tradename Baymix by Bayvette Corporation of Shawnee, Kansas), Rumensin® by Elanco of Indianapolis, Indiana and vitamin A was also studied.

The following formulations were mixed in accordance with Example I. The therapeutically active substances were added to each mixture immediately before the addition of the ferrous sulfate and magnesium oxide.

| INGREDIENT | FORMULATION 4A | 4B | 4C | 4D |
|---|---|---|---|---|
| Molasses | 56.5 | 56.57 | 57.1 | 57.467 |
| Water | 15.0 | 15.0 | 15.0 | 15.0 |
| Monoammonium phosphate | 6.0 | 6.0 | 6.0 | 6.0 |
| Attapulgite Clay | 1.5 | 1.5 | 1.5 | 1.5 |
| Bleachable Fancy Tallow | 5.0 | 5.0 | 5.0 | 5.0 |
| Rumensin 30 gm/lb | 1.0 | — | — | — |
| Phenothiazine NF 95% | — | 0.93 | — | — |
| Coumaphos (Baymix 50%) | — | — | 0.4 | — |
| Vitamin A&D Conc. 400,000/100,000 IU/gm | — | — | — | 0.0033 |
| Ferrous Sulfate | 8.0 | 8.0 | 8.0 | 8.0 |
| Magnesium Oxide | 7.0 | 7.0 | 7.0 | 7.0 |

The desired consumption for each block was 0.5 lb/head/day based on a 500 lb animal. The desired dose was supplied by the drug manufacturer and the percentage of each in the formulations is listed below.

| FORMULA NUMBER | DESIRED DOSE | % OF THERAPEUTICALLY ACTIVE SUBSTANCE IN FORMULATION |
|---|---|---|
| 4A | 150 mg/hd/day | 0.066 |
| 4B | 2 gm/hd/day | 0.881 |
| 4C | 2 mg/kg/day × 6 days | 0.200 |
| 4D | 30,000 IU/hd/day | 60,000 IU/lb |

With these data, a target amount of medicament was calculated and each animal block sampled to indicate the level of medicament under storage conditions of room temperature and 50° C. initially end at 2, 4, 8 and 12 weeks of storage.

The following table shows the results of the storage test

| Formula Number | Therapeutically Active Substance | Temperature | Intial | % OF TARGET (100% THEORETICAL) 2 Week | 4 Week | 8 Week | 12 Week |
|---|---|---|---|---|---|---|---|
| 4A | Rumensin | Room | 98.4 | 98.4 | 83.2 | 98.5 | 95.4 |
| | | 50°C. | 98.4 | 90.9 | 87.1 | 103.8 | 93.9 |
| 4B | Phenothiazine | Room | 100.4 | 77.9 | 75.1 | 97.0 | 84.5 |
| | | 50°C. | 100.4 | 80.5 | 71.8 | 92.2 | 99.1 |
| 4C | Coumaphos | Room | 90 | 115 | 110.5 | 92.5 | 99.5 |
| | | 50°C. | 90 | 110 | 111.5 | 98.5 | 107 |
| 4D | Vitamin A | Room | 100.6 | 105.7 | 120.7 | 96.9 | 95.7 |
| | | 50°C. | 100.6 | 75.4 | 77.8 | 104 | 93.4 |

It appears from the foregoing data that the animal feed block of the present invention serves as an effective carrier for the described medicament and retains their stability.

What is claimed is:

1. A process for preparing an animal feed block which comprises mixing about 18 to 65% by weight molasses, about 4 to 9% by weight monobasic salt of phosphoric acid, about 0.5 to 5% by weight water absorbent clay and 5 to 20% water under high speed shearing action for an effective amount of time to disperse the clay, admixing 5 to 30% animal fat, about 8% by weight ferrous sulfate and about 3 to about 15% by weight magnesium oxide to obtain a viscous nutrient mixture that solidifies to form a hard weather resistant block within one hour at room temperature, said block having a water activity of from 0.8 to 0.9.

2. The process of claim 1 wherein the magnesium oxide is present in the amount of about 7% by weight.

3. The process of claim 1 wherein the monobasic salt of phosphoric acid is monoammonium phosphate.

4. An animal feed block comprising a mixture of nutrient ingredients, about 18 to 65% by weight molasses, about 3 to about 15% by weight magnesium oxide, about 8% by weight ferrous sulfate, about 0.5 to 5% by weight clay, about 4 to 9% by weight monobasic salt of phosphoric acid, about 5–20% by weight water, about 5 to 30% fat and having a water activity of from 0.8 to 0.9; said block being solid, weather resistant and palatable and setting at room temperature within one hour.

5. The composition of claim 4, wherein the magnesium oxide is present in the amount of about 7% by weight.

6. An animal feed block comprising about 18 to 65% by weight of molasses, about 3 to about 15% by weight magnesium oxide, about 8% ferrous sulfate, about 0.5 to 5% clay, about 4 to 9% mono basic salt of phosphoric acid, 5 to 20% water, about 5 to 30% fat and having a water activity of from 0.8 to 0.9 said block being solid, weather resistant and palatable and setting at room temperature within one hour.

7. The composition of claim 6 wherein the monobasic salt of phosphoric acid is monoammonium phosphate.

8. The composition of claim 6 wherein the fat is selected from the group consisting of livestock edible animal and vegetable fats and oils.

9. The composition of claim 6 wherein about 0 to 3% by weight ammonium polyphosphate is present.

10. The composition of claim 6 wherein about 0 to 5% by weight tetrasodium pyrophosphate is present.

* * * * *